United States Patent
Farag et al.

(10) Patent No.: US 11,111,630 B2
(45) Date of Patent: Sep. 7, 2021

(54) RECOVER OF INORGANIC CHEMICALS OF THE PULP AND PAPER MAKING PROCESSES USING MICROWAVES AND RELATED TECHNIQUES

(71) Applicant: Sherif Farag, Saint-Constant (CA)

(72) Inventors: Sherif Farag, Saint-Constant (CA); Jamal Chaouki, Saint-Constant (CA)

(73) Assignee: GREENOVEL INC., Saint-Constant (CA)

( * ) Notice: Subject to any disclaimer, the term of this patent is extended or adjusted under 35 U.S.C. 154(b) by 0 days.

(21) Appl. No.: 16/170,014

(22) Filed: Oct. 24, 2018

(65) Prior Publication Data
US 2019/0119852 A1   Apr. 25, 2019

Related U.S. Application Data

(60) Provisional application No. 62/576,738, filed on Oct. 25, 2017.

(51) Int. Cl.
*D21C 11/12* (2006.01)
*D21C 11/00* (2006.01)
(Continued)

(52) U.S. Cl.
CPC ............ *D21C 11/125* (2013.01); *C10B 19/00* (2013.01); *C10B 53/02* (2013.01); *C10K 1/04* (2013.01);
(Continued)

(58) Field of Classification Search
CPC ... D21C 11/0042; D21C 11/12; D21C 11/125; D21C 11/127
See application file for complete search history.

(56) References Cited

U.S. PATENT DOCUMENTS

| | | | | |
|---|---|---|---|---|
| 9,598,529 B2 * | 3/2017 | Langlois | ............ | C08G 18/6492 |
| 2011/0114876 A1 * | 5/2011 | Brady | ...................... | C13K 1/02 |
| | | | | 252/182.12 |
| 2017/0306558 A1 * | 10/2017 | Zeeuw | ................. | D21C 11/125 |

FOREIGN PATENT DOCUMENTS

| | | | | | |
|---|---|---|---|---|---|
| CN | 1796290 A | * | 7/2006 | ................ | C02F 1/00 |
| CN | 105696399 A | * | 6/2016 | ............. | D21C 11/10 |

OTHER PUBLICATIONS

Dong et al., Mechanism on microwave-assisted acidic solvolysis of black-liquor lignin, 2014, Bioresource Technology, 162, p. 132-141. (Year: 2014).*

(Continued)

*Primary Examiner* — Anthony Calandra

(57) ABSTRACT

There is described a process for the recovering of inorganic chemicals of pulp and paper making processes (IC) and the production of biochemicals from black liquor (BL) using microwaves (MW) comprising: (a) filtration of BL to produce filtered BL, in a media, (b) drying of said filtered BL with MW in said media to produce dried BL, (c) pyrolysis of said dried BL with MW in said media to produce bio-oil, biogas, and solid residue, (d) recovering of said bio-oil, and (e) recovering of IC and biocarbon from said solid residue. The disclosed process does not require chemical additives compared to processes rely on precipitation of lignin to recover said IC. The disclosed process supports efficient, direct, and long-lasting reductions in greenhouse gas emissions and local air pollutants resulting from the current processes rely on burning BL in recovery boilers to recover said IC.

17 Claims, 2 Drawing Sheets

(51) Int. Cl.
- *D21C 11/04* (2006.01)
- *C10B 53/02* (2006.01)
- *C10K 1/04* (2006.01)
- *C10B 19/00* (2006.01)

(52) U.S. Cl.
CPC ...... *D21C 11/0007* (2013.01); *D21C 11/0042* (2013.01); *D21C 11/04* (2013.01); *D21C 11/12* (2013.01); *D21C 11/127* (2013.01)

(56) References Cited

OTHER PUBLICATIONS

Nasorn et al., Thermochemical conversion behavior of dried black liquor under microwave induced heating, 2014, Proc, of the Intl. Conf. on Advances in Civil, Structural, Environmental & Bio-Technology—CSEB 2014, p. 85-89. (Year: 2014).*

* cited by examiner

RECOVER OF INORGANIC CHEMICALS OF THE PULP AND PAPER MAKING PROCESSES USING MICROWAVES AND RELATED TECHNIQUES

CROSS-REFERENCE TO RELATED APPLICATIONS

This application claims priority of U.S. provisional patent application 62/576,738 filed on Oct. 25, 2017, the specification of which is hereby incorporated by reference.

BACKGROUND OF THE DISCLOSURE

(a) Technical Field

The subject matter disclosed generally relates to a recovery process. More particularly, the subject matter disclosed relates to a recovery process for the recovering of inorganic chemicals of the pulp and paper making processes (IC) and the production of biochemicals from black liquor (BL) using microwaves (MW).

(b) Related Prior Art

Pulp and paper making processes include a basic operation known as "digestion," where the wood chips are impregnated at particular temperature and pressure conditions.

An aqueous solution, such as sodium hydroxide and sodium sulfide, is used for the delignification step that separates lignin from the wood fibers.

Lignin and inorganic chemicals used in the digestion process leave the digester as a weak BL while the remaining material, which is the wood fibers, eventually becomes papers.

The most popular techniques for recovering of IC from BL are (1) to burn BL in recovery boilers and (2) to precipitate lignin from BL.

Burning of BL in recovery boilers (I) creates many problems concerning the formation of pollutants, such as sulfur oxide, nitrogen oxide, greenhouse gases, volatile organic compounds, carbon monoxide, fugitive dust emissions (e.g., soot and fly ash, metal fumes, and various aerosols); (II) limits the growth in pulp and paper production because of the maximum calorific load of the recovery boilers is reached or exceeded; (III) initiates undesirable reactions that negatively impact the yield and quality of the recovered IC; and (IV) squanders the value of the chemical products that can be produced from BL, such as bio-aromatics, biocarbon, and biogas.

Precipitation of lignin from BL is performed by applying several techniques, one of them is implemented by oxidation, acidification, filtration, and washing of BL, which is a very costly process. Furthermore, a massive budget is needed for central conversion processes.

Nowadays, precipitation of lignin is at a crossroads and encounters many challenges related to the marketing of the precipitated lignin.

A number of scientific research networks have been created to build technology platforms for lignin-based chemicals and materials (for example, Lignoworks NSERC Strategic Network—Canada). Almost all the studies and investigations interested in the valorization of lignin have reached a conclusion: "you can make everything from lignin except money." As a result, more than 95% of the total lignin produced worldwide is currently burned.

The main reason for the issues related to the marketing of the precipitated lignin is the high cost of lignin, which cannot be reduced because of the expense of the precipitation process.

For instance, the estimated minimum selling price of the lignin-based phenols is more than three times the market price of that of the fossil fuel-based. Thus, the investment in such a path has reached a crossroads since it creates an additional problem instead of enhancing the economics of the forest industry.

Over the last few decades, few attempts to directly decompose the network of BL have been made. Gasification was the most advanced technology; however, it has not been widely adopted commercially because of the problems associated with the conversion of BL. These associated problems include (I) only a portion of the sulfur is converted to sodium sulfide, and most of the synthetic gas exits as hydrogen sulfide and carbonyl sulfide; (II) the need for alternatives to recover the sulfur in the form of hydrogen sulfide or to avoid excessive overloading recausticizing in a lime kiln; (III) the high sodium concentration in the recovered cooking chemicals, and (IV) the needs for a downstream process to convert the produced gasses to biofuel and/or other products.

Consequently, research interest in the gasification of BL has declined and redirected to the precipitation of lignin and combustion of BL, which both have many problems as aforementioned.

Patent "CN 200410094068" invented a method for treating black liquor using MW radiation. The inventors of that patent have used black liquor of straw pulp as a raw material, and activated carbons, iron chips, iron oxides or steel slag as a MW catalyst. The invented method of that invention does not recover the IC nor produce biochemicals from BL. Also, using carbons, iron chips, iron oxides or steel slag is a must to perform the invented treatment process.

Patent "U.S. Pat. No. 4,637,858A" invented a process for the recovering of sodium hydroxide directly from black liquor. The process based on reacting carbon with other chemicals in BL in the absence of oxygen to produce a product containing sodium carbide, and hydrolyzing the sodium carbide to form sodium hydroxide. The invented process of that invention is carried out at a temperature between about 1900° C. and 2480° C. The radiant energy has a wavelength in the near infrared region; it means the wavelength of the applied waves is 1-2 microns, while for MW is 12.5 cm at 2.45 GHz. In that patent, the invented method does not recover the IC and squanders the value of the chemical products that can be produced from BL. Also, infrared radiation is applied as the source of heating not MW.

It is highly needed to develop a technique that recovers IC and at the same time avoids the pollutants formed from the recovery processes rely on the burning of BL; saves the chemicals consumed in the techniques rely on the precipitation of lignin; does not limit the growth in the pulp and paper production; decreases the massive budget needed for the centralized conversion methods; does not squander the value of the chemical products that can be produced from BL, among other requirements.

Therefore, the objectives of the present disclosure are to overcome most of the issues, limitations, and difficulties of the current conventional recovery methods; provide a novel technique to recover IC economically and, besides, produce biochemicals from BL using MW.

SUMMARY OF THE DISCLOSURE

According to an embodiment, there is provided a process for the recovering of inorganic chemicals of pulp and paper making processes (IC) and the production of biochemicals from black liquor (BL) using microwaves (MW) comprising:
(a) filtration of BL to produce filtered BL, in a media,
(b) drying of said filtered BL with MW in said media to produce dried BL,
(c) pyrolysis of said dried BL with MW in said media to produce bio-oil, biogas, and solid residue,
(d) recovering of said bio-oil, in a condensation system operating at a temperature about dew point of compounds to be recovered, and
(e) recovering of IC and biocarbon from said solid residue.

The said process may be batch operated, semi-batch operated, or continuous-flow operated.

The said process may be directly integrated into existing pulp and paper making processes for on-site application, or separated from existing pulp and paper making processes for central application.

The said filtration of BL 1 may be performed at ambient temperature, ambient pressure, any other temperature and pressure conditions, or combinations of thereof.

The said filtered BL may have a higher solid concentration, for example from about 30% to about 80%.

The said drying of said filtered BL 2 may be performed for a time sufficient to allow generation of heat, providing thermal drying at a temperature depends on characteristics of said filtered BL, and/or any other factors.

The said drying of said filtered BL may be performed at a temperature about 105° C., or higher, or lower, depending on the characteristics of said filtered BL, and/or any other factors.

The said drying of said filtered BL may be performed through absorption of MW by said filtered BL, water content in said filtered BL, and/or said media; wherein said filtered BL and water are efficient to absorb MW and generate heat to initiate said drying.

The said drying of said filtered BL may be performed through hybrid drying such that heat is provided through (1) absorption of MW by said filtered BL, water content in said filtered BL, and/or said media; and (2) conventional heating.

The steam and/or water vapor produced from said drying of said filtered BL may be used to purge said media.

The said pyrolysis of said dried BL 3 may be performed for a time sufficient to allow generation of heat, providing thermal decomposition at a temperature higher than that of said drying of said filtered BL and enough to decompose most of the chemical bonds of said dried BL, leading to separating volatiles from fixed carbon bonds and said IC.

The said pyrolysis of said dried BL may be performed at a temperature from about 200° C. to about 800° C.

The said pyrolysis of said dried BL may be performed through absorption of MW by said dried BL, water content in said dried BL (if any), and/or said media.

The high dielectric properties of said dried BL at a frequency of MW makes it highly efficient to absorb MW and generate heat to initiate said pyrolysis.

The said pyrolysis of said dried BL may be performed through hybrid pyrolysis such that heat is provided through (1) absorption of MW by said dried BL, water content in said dried BL (if any), and/or said media; and (2) conventional heating.

The said pyrolysis of said dried BL may be initiated after the oxygen content within said media is purged and reached at a suitable residual content for said pyrolysis to be proceed (for example, about 4% volume basis).

The said condensation system 5 may be composed of a single condenser operating at a temperature sufficient to condense vapor produced from said pyrolysis of said dried BL as a mixture of chemical compounds.

The said condensation system 5 may be composed of multiple condensers operating at a temperature sufficient to condense vapor produced from said pyrolysis of said dried BL in different stages, based on dew point of compounds to be recovered as individual chemical families, and/or any other aspect.

The said condensation system may be composed of multiple condensers operating at temperatures sufficient to separate the organic chemicals from the aqueous phase produced from said pyrolysis of said dried BL.

The said individual chemical families may be heavy molecular weight compounds, medium molecular weight compounds, low molecular weight compounds, and aqueous phase.

The said mixture of chemical compounds recovered from said single condenser may be sent to said media for further decomposition, processing, separation, and/or any other purposes.

The said individual chemical families recovered from said multiple condensers may be sent to said media for further decomposition, processing, separation, and/or any other purposes.

The said solid residue after said pyrolysis of said dried BL may be processed to recover said IC and said biocarbon using the aqueous phase collected from said filtration of BL and/or the condensed steam from said drying of said filtered BL 4.

The said IC may be dissolved in the aqueous phase collected from said filtration of BL and/or the condensed steam from said drying, and sent to the digester of pulp and paper making process for aquatic and said IC recycling.

The said solid residue after said pyrolysis of said dried BL may be burned to recover said IC directly.

The said biogas may be compressed in a vessel for further uses.

The said biogas may be burned to provide heat.

The said process supports efficient, direct, and long-lasting reductions in greenhouse gas emissions and local air pollutants resulting from the current process of recovering IC.

The said process provides a cost-effective and clean alternative methodology to those rely on burning BL in recovery boilers.

The said process prevents the production of many millions of tonnes of sulfur oxide, nitrogen oxide, greenhouse gases, volatile organic compounds, carbon monoxide, fugitive dust emissions (e.g., soot and fly ash, metal fumes, and various aerosols), and other pollutants produced every year around the world from burning BL in recovery boilers.

The said process relies on the thermal decomposition of BL through the exposure to MW. The unique advantage of the MW heating mechanism, compared to the drawbacks of the superficial heat transfer of conventional heating, is that it produces the products of unparalleled quality and yield, such as bio-aromatics and biocarbon. Those products may be used in the production of plenty of multiple products including intermediates in the synthesis of pharmaceuticals, phenol formaldehyde resins, antioxidants, gasoline additives, polymerization initiators, pesticides, rubber reinforcing, block copolymers, composites, carbon fibers, and carbon sieves.

The said bio-oil and said biocarbon, which have high-quality and are commercially viable materials, may be employed to replace petrochemicals and, thus, allow the forest industry to produce green, highly functional, and competitively priced end-products with significant novel properties.

The production of said bio-oil and said biocarbon will diversify the commodities of the forestry industry and, in turn, enhances world bio-economy while decreasing the dependency on petrochemicals and negative environmental impact of oil extraction and petrochemical production.

The applying of said MW in said pyrolysis of said dried BL can avert most of the problems associated with conventional heating pyrolysis, most importantly, char layer formation during conventional pyrolysis. This aspect can significantly enhance product selectivity because of reducing undesirable intermediate thermal steps.

The said process employs MW for aquatic recycling, which will reduce water use in the pulp and paper manufacturing industry, one of the largest industrial water users in Canada.

The cost of recovering said IC would be decreased since said process does not consume any chemical additives compared to the precipitation of lignin.

The said process does not have any issues to meet the requirements of growth pulp and paper production since the recovery boiler is not included in said process.

There may be no need to build a central conversion plant required for the precipitation of lignin because said process can easily be integrated into existing pulp and paper mills.

The following terms are defined below.

The term "black liquor" is intended to the by-products produced from the pulp and paper making process after the delignification step, or from any other processes; and mainly contains lignin, IC, and water.

The term "inorganic chemicals of the pulp and paper making processes" is intended to mean the chemicals used for the delignification purposes that separate lignin from the wood fibers, and/or any other purposes.

The term "biocarbon" is intended to mean the carbonaceous material remaining after recovering the IC from the solid residue produced from said pyrolysis of said dried BL.

The term "media" is intended to mean a control volume in which said filtration of BL, said drying of said filtered BL, said pyrolysis of said dried BL, and/or any other reaction or process is carried out.

The term "pyrolysis" is intended to mean the thermochemical decomposition of a substance by heating that at a temperature enough for the decomposition in a sufficient oxygen-free environment.

The term "pyrolysis products" is intended to mean bio-oil, biogas, and solid residue produced from said pyrolysis of said dried BL.

The term "Microwaves" is intended to mean electromagnetic waves with frequencies between about 0.3 GHz and 300 GHz.

BRIEF DESCRIPTION OF THE DRAWINGS

Further features and advantages of the present disclosure will become apparent from the following detailed description, taken in combinations with the appended drawings, in which.

It will be noted that throughout the appended drawings, like features are identified by like reference numerals.

DETAILED DESCRIPTION OF THE DISCLOSURE

Figure 1:
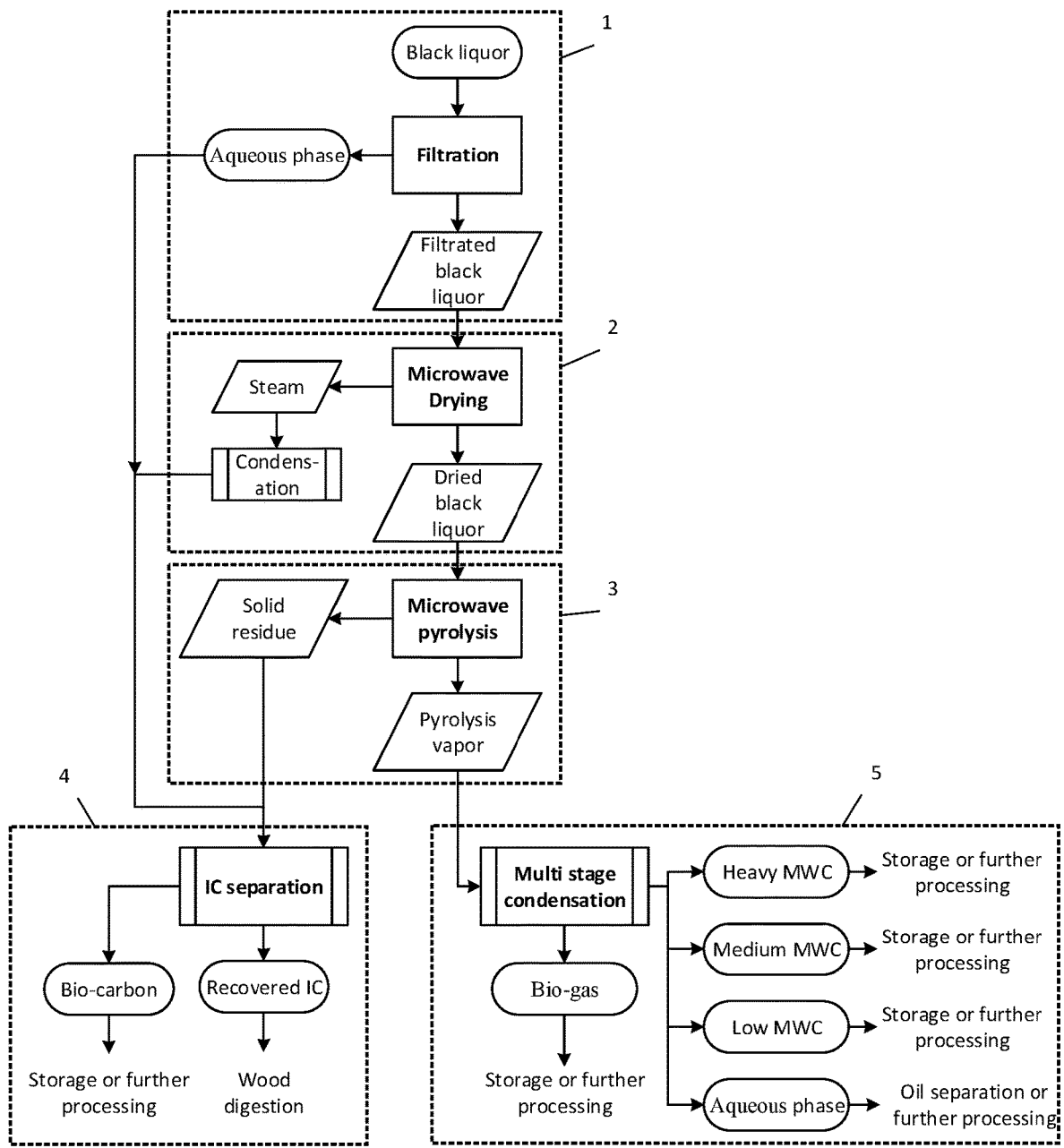
FIG. 1 illustrates a flowchart of the disclosed process for the recovering of inorganic chemicals of the pulp and paper making processes (IC) and the production of biochemicals from black liquor (BL) using microwaves (MW)

In embodiments, there is disclosed a microwave recovery process for the recovering of inorganic chemicals of pulp and paper making processes (IC) and the production of biochemicals from black liquor (BL) using microwaves (MW) comprising:
  (a) filtration of BL to produce filtered BL, in a media,
  (b) drying of said filtered BL with MW in said media to produce dried BL,
  (c) pyrolysis of said dried BL with MW in said media to produce bio-oil, biogas, and solid residue,
  (d) recovering of said bio-oil, in a condensation system operating at a temperature about dew point of compounds to be recovered, and
  (e) recovering of IC and biocarbon from said solid residue.

In embodiments, said process may be batch operated, semi-batch operated, or continuous-flow operated.

In embodiments, said process may be directly integrated into existing pulp and paper making processes for on-site application, or separated from existing pulp and paper making processes for central application.

In some embodiments, said filtration of BL 1, said drying of said filtered BL 2, said pyrolysis of said dried BL 3 may be repeated once or more.

In embodiments, said process further comprising a MW generator system to provide the needed electromagnetic waves for said drying of said filtered BL and said pyrolysis of said dried BL, and/or for, any other purposes.

In some embodiments, said MW may be applied at a frequency range from about 915 MHz to about 2450 GHz, or higher, or lower.

In embodiments, the firm interaction between MW and BL is a crucial factor behind employing of MW in said drying of said filtered BL and said pyrolysis of said dried BL.

In embodiments, the measured dielectric properties of said dried BL at 2.45 GHz are tabulated in Table 1.

TABLE 1

| Dielectric properties of dried black liquor and carbon at 2.45 GHz | | |
| --- | --- | --- |
| Material | Dielectric constant (F/m) | Dielectric loss factor (F/m) |
| Black Liquor | 7.1 ± 0.2 | 2.5 ± 0.1 |
| Carbon | 7.0 ± 0.1 | 2.0 ± 0.2 |

In embodiments, said dielectric properties demonstrate the strong ability of said dried BL to convert MW energy to heat energy. It is well known that carbon is one of the most active MW receptors and, consequently, used as a MW thermal catalyst in several reactions. Since the dielectric properties of said dried BL are higher than carbon, said dried BL is stronger to absorb MW and generate heat than carbon.

In embodiments, the experimental measurements show that at the same MW power, exposure time, and other conditions, said dried BL reaches a temperature of 20% higher than that of carbon.

In embodiments, said filtration of BL may be performed at ambient temperature, ambient pressure, any temperature and pressure conditions, or combinations of thereof.

In some embodiments, said filtered BL have a higher solid concentration than the non-filtered BL, for example from about 30% to about 80%.

In some embodiments, said filtration of BL may be performed in said media or in a separate media.

In embodiments, said drying of said filtered BL and said pyrolysis of said dried BL may be performed at ambient pressure or any pressure conditions.

In embodiments, said filtered BL is heated up to a temperature sufficient to evaporate water content in BL.

In some embodiments, said drying of said filtered BL may be performed for a time sufficient to allow generation of heat, providing thermal drying at a temperature depends on characteristics of said filtered BL, and/or any other aspects.

In some embodiments, said drying of said filtered BL is performed at a temperature about 105° C., or higher, or lower.

In some embodiments, said drying of said filtered BL may be performed through absorption of MW by said filtered BL, water content in said filtered BL, and/or said media.

In embodiments, said filtered BL and water are efficient to absorb MW and generate heat to initiate said drying.

In some embodiments, said drying of said filtered BL may be performed through hybrid drying such that heat is provided through (1) absorption of MW by said filtered BL, water content in said filtered BL, and/or said media; and (2) conventional heating.

In embodiments, steam and/or water vapor produced from said drying of said filtered BL may be used to purge said media.

In embodiments, said pyrolysis of said dried BL may be performed for a time sufficient to allow generation of heat, providing thermal decomposition at a temperature higher than that of said drying of said filtered BL and enough to decompose most of the chemical bonds of said dried BL, leading to separating volatiles from fixed carbon bonds and said IC.

In some embodiments, said temperature of said pyrolysis of said dried BL depends on the characteristics of said dried BL, and/or any other aspects.

In some embodiments, said temperature of said pyrolysis of said dried BL is performed at a temperature less than the melting point of the IC to be recovered.

In some embodiments, said pyrolysis of said dried BL may be performed at a temperature from about 200° C. to about 800° C.

In embodiments, said pyrolysis of said dried BL may be performed through absorption of MW by said dried BL, water content in said dried BL (if any), and/or said media.

In some embodiments, said dried BL may be exposed to a MW power higher than that of said drying of filtered BL.

In embodiments, said dried BL is efficient to absorb MW and generate heat to initiate said pyrolysis reaction, for the high dielectric properties of said dried BL at a frequency of MW, refer to Table 1.

In some embodiments, said pyrolysis of said dried BL may be performed through hybrid pyrolysis such that heat is provided through (1) absorption of MW by said dried BL, water content in said dried BL (if any), and/or said media, and (2) conventional heating.

In embodiments, said pyrolysis of said dried BL may be initiated after oxygen content within said media is purged and reached at a suitable residual content for said pyrolysis to be proceed (about 4% volume basis).

In some embodiments, said conventionnel heating may be provided through electric heaters, burning the biogas produced from said pyrolysis of said dried BL, burning said solid residue, any other heating mechanism, or combinations of thereof.

In embodiments, said condensation system may be performed at a temperature sufficient to maintain the vapor produced from said pyrolysis of said dried BL liquid.

In embodiments, said condensation system 5 may be performed at a temperature around the dew point of the chemicals to be recovered.

In some embodiments, said condensation system may be composed of a single condenser operating at a temperature sufficient to condense the vapor produced from said pyrolysis of said dried BL as a mixture of chemical compounds.

In some embodiments, said condensation system may be composed of a set of condensers operating at a temperature sufficient to condense the vapor produced from said pyrolysis of said dried BL as a mixture of chemical compounds.

In some embodiments, said temperature sufficient to condense the vapor produced from said pyrolysis of said dried BL as a mixture of chemical compounds is about 5° C., or higher, or lower, depending on the dew point of the compounds to be recovered, and or any other aspects.

In some embodiments, said condensation system may be composed of multiple condensers operating at different temperatures sufficient to condense the vapor produced from said pyrolysis of said dried BL in different stages based on the dew point of the compounds to be recovered as individual chemicals or individual chemical families, and/or any other aspects.

In some embodiments, said condensation system may be composed of multiple condensers operating at different temperatures sufficient to separate the organic chemicals from the aqueous phase produced from said pyrolysis of said dried BL.

In some embodiments, the first condenser—or the first set of condensers—of said multiple condensers may be operating at a temperature or temperatures sufficient to condense the heavy molecular weight compounds produced from said pyrolysis of said dried BL, for example from about 120° C. to about 150° C., depending on the compounds to be recovered.

In some embodiments, the second condenser—or the second set of condensers—of said multiple condensers may be operating at a temperature or temperatures sufficient to condense the medium molecular weight compounds produced from said pyrolysis of said dried BL, for example from about 80° C. to about 110° C., depending on the compounds to be recovered.

In some embodiments, the third condenser—or the third set of condensers—of said multiple condensers may be operating at a temperature or temperatures sufficient to condense the low molecular weight compounds produced from said pyrolysis of said dried BL, for example from about 50° C. to about 70° C., depending on the compounds to be recovered.

In some embodiments, the fourth condenser—or the fourth set of condensers—of said multiple condensers may be operating at a temperature or temperatures sufficient to condense the aqueous phase and other compounds that are not condensed in the aforementioned three condenses and produced from said pyrolysis of said dried BL, for example at about 5° C., or higher, or lower, depending on the compounds to be recovered.

According to some embodiments, said aqueous phase collected from said filtration of BL may be used to recover IC from said solid residue after said pyrolysis of said dried BL.

According to some embodiments, said aqueous phase collected from said filtration of BL may be returned to the digester of the pulp and paper making processes to digest more wood, and/or for any other purposes.

According to some embodiments, said aqueous phase collected from said filtration of BL may be pumped into a container for further uses.

According to some embodiments, said steam produced from said drying of said filtered BL may be condensed after purging said media and used to recover IC from said solid residue after said pyrolysis of said dried BL.

According to some embodiments, said steam produced from said drying of said filtered BL may be condensed after purging said media and returned to the digester of the pulp and paper making processes to digest more wood, and/or any other purposes.

According to some embodiments, said steam produced from said drying of said filtered BL may be condensed after purging said media and pumped into a container for further uses.

According to some embodiments, said mixture of chemical compounds recovered from said condensation system may be pumped into a container.

According to some embodiments, said mixture of chemical compounds recovered from said condensation system may be sent to said media for further decomposition, separation, upgrading, and/or any other purposes.

According to some embodiments, said individual chemicals or said individual chemical families recovered from said multiple condensers may be pumped into different containers based on their characteristics.

According to some embodiments, said individual chemicals or said individual chemical families recovered from said multiple condensers may be sent to said media for further decomposition, separation, upgrading, and/or any other purposes.

According to some embodiments, said heavy molecular weight compounds recovered from the first condenser—or the first set of condensers—may be pumped into a container.

According to some embodiments, said heavy molecular weight compounds recovered from the first condenser—or the first set of condensers—may be sent to said media for further decomposition, separation, upgrading, and/or any other purposes.

According to some embodiments, said medium molecular weight compounds recovered from the second condenser—or the second set of condensers—may be pumped into a container.

According to some embodiments, said medium molecular weight compounds recovered from the second condenser—or the second set of condensers—may be sent to said media for further decomposition, separation, upgrading, and/or any other purposes.

According to some embodiments, said low molecular weight compounds recovered from the third condenser—or the third set of condensers—may be pumped into a container.

According to some embodiments, said low molecular weight compounds recovered from the third condenser—or the third set of condensers—may be sent to said media for further decomposition, separation, upgrading, and/or any other purposes.

According to some embodiments, said low molecular weight compounds recovered from the fourth condenser—or the fourth set of condensers—may be pumped into a container.

According to some embodiments, said low molecular weight compounds recovered from the fourth condenser—or the fourth set of condensers—may be sent to said media for further decomposition, separation, upgrading, and or any other purposes.

According to some embodiments, said aqueous phase recovered from the fourth condenser—or the fourth set of condensers—may be pumped into a container.

According to some embodiments, said aqueous phase recovered from the fourth condenser—or the fourth set of condensers—may be sent to said media for further decomposition, separation, upgrading, and or any other purposes.

In some embodiments, said solid residue after said pyrolysis of said dried BL may furtherly be processed to separate said IC and said biocarbon using said aqueous phase collected from said filtration of BL and/or the condensed steam from said drying of said filtered BL4.

In some embodiments, said solid residue after said pyrolysis of said dried BL may be burned at special conditions to recover said IC directly and its thermal value.

In some embodiments, said IC dissolved in said aqueous phase may be sent to the digestion process for the aquatic and recovered IC recycling.

In embodiments, the relatively weak dielectric properties of said IC compared to that of said dried BL makes said recovered IC from this disclosure may not thermally be affected during said drying of said filtered BL and said pyrolysis of said dried BL.

In some embodiments, said biogas produced from said pyrolysis of said dried BL may be compressed in a vessel for further uses.

In some embodiments, said biogas may be used to provide bio-energy for the site, which could furthermore be employed to generate electricity at almost net-zero carbon footprint.

In embodiments, said media is any control volume in which said filtration of BL, said drying of said filtered BL, said pyrolysis of said dried BL, and/or any other reaction or process is carried out.

In some embodiments, said media may be agitated under mixing conditions for minimizing the heat and mass transfer limitations, and for any other purposes.

In some embodiments, said media may be centered relative to a vertical or horizontal axis, or combinations of thereof.

In some embodiments, said media may be linearly moving, oscillating, or rotating relative to a fixed point or axis, or combinations of thereof.

In some embodiments, said media may be centered relative to one or more directions or axis.

In some embodiments, the temperature of the inner walls of said media may be increased to a value sufficient to avoid condensation and/or solidification of materials thereon.

In some embodiments, the temperature of the inner walls of said media depends on the dew point of said chemicals produced from said pyrolysis of said dried BL, and/or any other aspects.

In some embodiments, the temperature of the inner walls of said media may be increased to a value that does not negatively impact the yield and quality of the products produced from said pyrolysis of said dried BL and said recovered IC.

In some embodiments, the temperature of the inner walls of said media may be increased to between about 100° C. to about 400° C.

In some embodiments, the inner wall of said media may be heated using electric heaters, strong MW-receptor fixed thereon, directly or indirectly burning of said biogas produced from said pyrolysis of said dried BL, steam produced from said drying of said filtered BL, and/or combinations of thereof.

Figure 2:
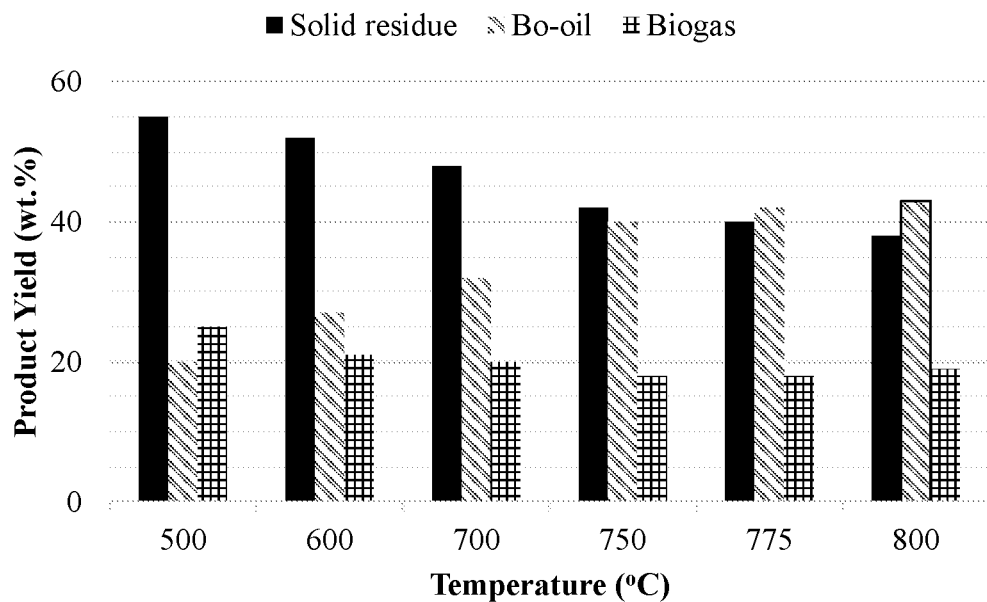
FIG. 2 illustrates the effect of pyrolysis temperature on the yield of the pyrolysis products after said pyrolysis of said dried BL.

In some embodiments, it has been found that varying the temperature of said pyrolysis of said dried BL will have a profound effect on the yield of said solid residue, said biogas, and said bio-oil. Now referring to FIG. 2, for example, it is demonstrated that said pyrolysis products may be dependent on said pyrolysis temperature from 500° C. to 800° C. FIG. 2 shows that increasing of pyrolysis temperature decreases the yield of said solid residue after said pyrolysis reaction. FIG. 2 shows that increasing of pyrolysis temperature increases the yield of said bio-oil after said pyrolysis reaction. FIG. 2 shows that increasing of pyrolysis temperature does not have significant impacts on the yield of said biogas produced from said pyrolysis reaction.

Figure 3:
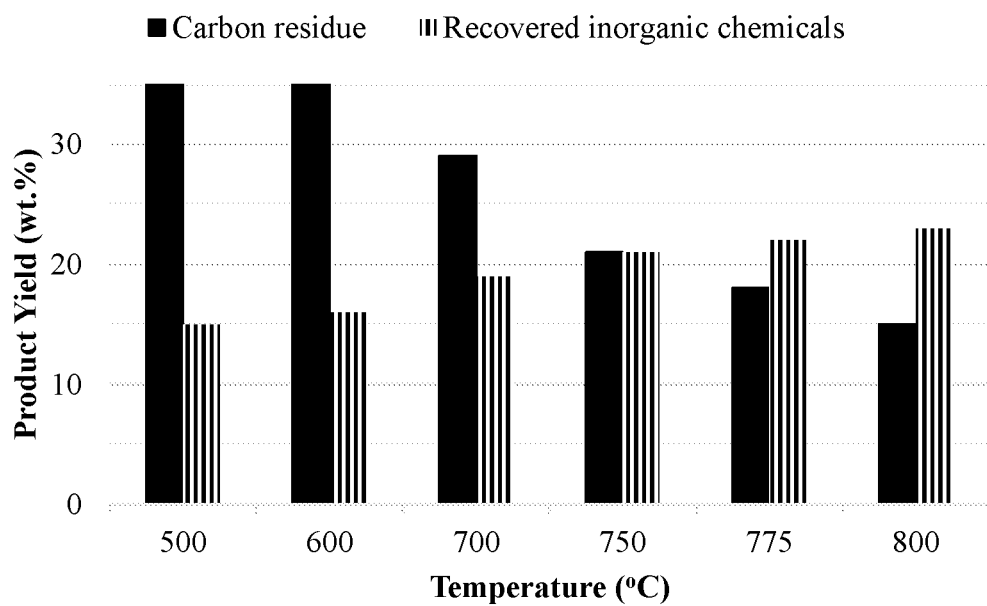
FIG. 3 illustrates the effect of pyrolysis temperature on the yield of the separated IC from said solid residue after said pyrolysis of said dried BL.

In some embodiments, it has been found that varying of temperature of said pyrolysis of said dried BL will not have a profound effect on the yield of said recovered IC. Now referring to FIG. 3, for example, it is demonstrated that the yield of said recovered IC may be dependent on said pyrolysis temperature from 500° C. to 750° C. FIG. 3 shows that increasing of pyrolysis temperature from 750° C. to 800° C. does not noticeably impact the yield of said recovered IC.

In some embodiments, the average yield (from 750° C. to 800° C.) obtained from the disclosed process is, for example, (1) said solid residue: 40 wt. %, which contains 55 wt. % said IC and 45 wt. % said biocarbon; (2) said bio-oil, 42 wt. %, which is mostly hydrocarbons, in particularly bio-aromatics; and (3) said biogas, 18 wt. %. The 55 wt. % of said solid residue—in other words, 22 wt. % of dried BL—is the typical percentage of IC used in the pulp and paper making processes. This result proves that the disclosed process able to recovers about 100% of said IC that are present in BL.

In some embodiments, Table 2, for example, shows the identified chemical families in the condensed vapor produced from said pyrolysis of said dried BL.

TABLE 2

Identified chemical families in the condensed vapor produced from said pyrolysis of said dried BL

| Identification | Concentration [mg/g] |
| --- | --- |
| Aromatics such as phenols, benzenes, guaiacols, catechols, etc. | 540 |
| Heavy molecular weight compounds | 435 |
| Others compounds | 25 |
| Total | 1000 |

In embodiments, said process supports efficient, direct, and long-lasting reductions in greenhouse gas emissions and local air pollutants resulting from the current process of recovering IC.

In embodiments, said process provides a cost-effective and clean alternative methodology to those rely on burning BL in recovery boilers.

In embodiments, said process would prevent the production of many millions of tonnes of sulfur oxide, nitrogen oxide, greenhouse gases, volatile organic compounds, carbon monoxide, fugitive dust emissions (e.g., soot and fly ash, metal fumes, and various aerosols), and other pollutants produced every year around the world from burning BL in recovery boilers.

In embodiments, said process relies on the thermal decomposition of BL through the exposure to MW. The unique advantage of the MW heating mechanism, compared to the drawbacks of the superficial heat transfer of conventional heating, is that it produces the products of unparalleled quality and yield, such as bio-aromatics and biocarbon. Those products can be used in the production of plenty of multiple products including intermediates in the synthesis of pharmaceuticals, phenol formaldehyde resins, antioxidants, gasoline additives, polymerization initiators, pesticides, rubber reinforcing, block copolymers, composites, carbon fibers, and carbon sieves.

In some embodiments, said bio-oil and said biocarbon, which have high-quality and are commercially viable materials, may be employed to replace petrochemicals and, thus, allow the forest industry to produce green, highly functional, and competitively priced end-products with significant novel properties.

In some embodiments, production of said bio-oil and said biocarbon will diversify the commodities of the forestry industry and, in turn, enhances world bio-economy while decreasing our dependency on petrochemicals and negative environmental impact of oil extraction and petrochemical production.

In some embodiments, applying of said MW in said pyrolysis of said dried BL can avert most of the problems associated with conventional heating pyrolysis, most importantly, char layer formation during conventional pyrolysis. This aspect can significantly enhance product selectivity because of reducing undesirable intermediate thermal steps.

In some embodiments, said process employs MW for aquatic recycling, which will reduce water use in the pulp and paper manufacturing industry, one of the largest industrial water users in Canada.

In some embodiments, the cost of recovering said IC would be decreased since said process does not consume any chemical additives compared to the precipitation of lignin.

In some embodiments, said process does not have any issues to meet the requirements of growth pulp and paper production since the recovery boiler is not included in said process.

In some embodiments, there may be no need to build a central conversion plant required for the precipitation of lignin because said process can easily be integrated into existing pulp and paper mills.

The invention claimed is:
1. A process for the recovering of inorganic chemicals of pulp and paper making processes (IC) and the production of biochemicals from black liquor (BL) using microwaves (MW) comprising:
(a) filtration of BL to produce filtered BL, in a media,
(b) drying of said filtered BL with MW in said media to produce dried BL,
(c) pyrolysis of said dried BL with MW in said media to produce bio-oil, biogas, and solid residue,

(d) recovering of said bio-oil, in a condensation system operating at a temperature about dew point of compounds to be recovered, and (e) recovering of IC and biocarbon from said solid residue.

2. A process according to claim 1, wherein said drying is performed for a time sufficient to allow generation of heat, providing thermal drying at a temperature of about 105° C.

3. A process according to claim 2, wherein said drying is performed through absorption of MW by said filtered BL, water content in said filtered BL, and/or said media; wherein said filtered BL and water are efficient to absorb MW and generate heat to initiate said drying.

4. A process according to claim 1, wherein said pyrolysis is performed for a time sufficient to allow generation of heat, providing thermal decomposition at a temperature higher than that of said drying and enough to decompose most of the chemical bonds of said dried BL, leading to separating volatiles from fixed carbon bonds and said IC.

5. A process according to claim 4, wherein said pyrolysis is performed at a temperature from about 200° C. to about 800° C.

6. A process according to claim 4, wherein said pyrolysis is performed through absorption of MW by said dried BL, water content in said dried BL (if any), and/or said media; wherein high dielectric properties of said dried BL at a frequency of MW dielectric constant: 7.1±0.2 and dielectric loss factor: 2.5±0.1 at 2.45 GHz) makes BL highly efficient to absorb MW and generate heat to initiate said pyrolysis.

7. A process according to claim 6, wherein said pyrolysis is initiated after oxygen content within said media is purged and reached at a suitable residual content for said pyrolysis to be proceed (about 4% volume basis).

8. A process according to claim 1, wherein said condensation system composing of a single condenser operating at a temperature about 5° C., which is sufficient to condense vapor produced from said pyrolysis as a mixture of chemical compounds.

9. A process according to claim 1, wherein said condensation system composing of multiple condensers operating at temperatures sufficient to condense vapor produced from said pyrolysis of said dried BL in different stages, based on dew point of compounds to be recovered as individual chemical families.

10. A process according to claim 1, wherein said solid residue is processed to recover said IC and said biocarbon using aqueous phase collected from said filtration of BL, and/or condensed steam from said drying of said filtered BL.

11. A process according to claim 10, wherein said IC and biocarbon are obtained at an average yield of 22 wt. % and 18 wt. %, respectively, of said dried BL.

12. A process according to any one of claims 10 and 11, wherein said IC is dissolved in aqueous phase collected from said filtration of BL, and/or condensed steam from said drying of filtered BL, and sent to digester of pulp and paper making process for aquatic and said IC recycling.

13. A process according to claim 10, wherein said solid residue is burned to recover said IC directly and its thermal value.

14. A process according to claim 1, wherein said process is batch operated, semi-batch operated, or continuous-flow operated.

15. A process according to claim 1, wherein inner wall temperature of said media is increased to about 150° C. to avoid condensation and/or solidification of materials thereon, and at the same time it does not negatively impact the yield and quality of said bio-oil, said biocarbon said biogas, and said IC.

16. A process according to claim 14, wherein said process is directly integrated into existing pulp and paper making processes for on-site application, separated from existing pulp and paper making processes for central application, or combinations of thereof.

17. A process according to claim 1, wherein said process further comprising a MW generator system to provide the needed electromagnetic waves for said drying of said filtered BL, said pyrolysis of said dried BL, and/or any other purposes.

* * * * *